United States Patent
Lehman et al.

(10) Patent No.: US 10,248,192 B2
(45) Date of Patent: Apr. 2, 2019

(54) GAZE TARGET APPLICATION LAUNCHER

(71) Applicant: Microsoft Technology Licensing, LLC, Redmond, WA (US)

(72) Inventors: Taylor Lehman, Seattle, WA (US); Kim Pascal Pimmel, Seattle, WA (US); Xerxes Beharry, Kirkland, WA (US); Ranjib Badh, Sammamish, WA (US); Jiashi Zhang, Issaquah, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 400 days.

(21) Appl. No.: 14/559,841

(22) Filed: Dec. 3, 2014

(65) Prior Publication Data

US 2016/0162020 A1   Jun. 9, 2016

(51) Int. Cl.

| G06F 3/042 | (2006.01) |
| G06F 3/048 | (2013.01) |
| G02B 27/01 | (2006.01) |
| G06F 3/01 | (2006.01) |
| G06F 3/0484 | (2013.01) |
| G06F 3/0482 | (2013.01) |

(52) U.S. Cl.
CPC ............ G06F 3/013 (2013.01); G02B 27/01 (2013.01); G06F 3/017 (2013.01); G06F 3/0482 (2013.01); G06F 3/04842 (2013.01); G06F 2203/0381 (2013.01)

(58) Field of Classification Search
CPC . G06F 3/048; G06F 3/013; G06F 3/00; G06F 3/041; G06F 3/042; G02B 27/00; G02B 2027/00; G02B 27/01; G06T 9/00; H04N 13/00; H04N 17/00; G09G 5/00
See application file for complete search history.

(56) References Cited

U.S. PATENT DOCUMENTS

| 8,217,856 B1 * | 7/2012 | Petrou .................. G02B 27/017 |
| | | 345/8 |
| 8,743,244 B2 | 6/2014 | Vartanian et al. |
| 8,767,014 B2 | 7/2014 | Vaught et al. |
| 9,007,301 B1 * | 4/2015 | Raffle .................... G09G 3/003 |
| | | 345/156 |

(Continued)

FOREIGN PATENT DOCUMENTS

WO     2012107892 A2    8/2012

OTHER PUBLICATIONS

"An Eye Tracking System for High Performance Augmented Reality Applications", In Proceedings of Image Processing, May 15, 2008, 8 Pages.

(Continued)

*Primary Examiner* — Hugo Molina
(74) *Attorney, Agent, or Firm* — Alleman Hall Creasman & Tuttle LLP

(57) ABSTRACT

A gaze target is recognized via an eye tracking camera. An application launcher is displayed, via a display, at the gaze target based on a user trigger. The application launcher presents a plurality of applications selectable for launching. A user selection of one of the plurality of applications is recognized. The application launcher is replaced with the selected one of the plurality of applications at the gaze target via the display.

17 Claims, 8 Drawing Sheets

(56) References Cited

U.S. PATENT DOCUMENTS

| | | | | |
|---|---|---|---|---|
| 9,035,878 | B1* | 5/2015 | Wheeler | G06F 3/0484 345/156 |
| 2009/0199127 | A1* | 8/2009 | Sareen | G06F 3/0481 715/781 |
| 2010/0141590 | A1* | 6/2010 | Markiewicz | G06F 3/0488 345/173 |
| 2010/0199232 | A1 | 8/2010 | Misty et al. | |
| 2012/0005624 | A1 | 1/2012 | Vesely | |
| 2012/0081375 | A1* | 4/2012 | Robert | G06F 17/30126 345/522 |
| 2012/0249741 | A1* | 10/2012 | Maciocci | G06F 3/011 348/46 |
| 2012/0272179 | A1* | 10/2012 | Stafford | G06F 3/012 715/781 |
| 2012/0299962 | A1 | 11/2012 | White et al. | |
| 2013/0050432 | A1* | 2/2013 | Perez | H04N 13/0278 348/47 |
| 2013/0194164 | A1 | 8/2013 | Sugden et al. | |
| 2013/0241805 | A1* | 9/2013 | Gomez | G09G 3/003 345/8 |
| 2013/0278631 | A1 | 10/2013 | Border et al. | |
| 2013/0304479 | A1* | 11/2013 | Teller | G06F 3/013 704/275 |
| 2013/0335303 | A1 | 12/2013 | Maciocci et al. | |
| 2014/0049452 | A1 | 2/2014 | Maltz | |
| 2014/0092014 | A1* | 4/2014 | Srinivasan | G06F 3/013 345/158 |
| 2014/0160001 | A1 | 6/2014 | Kinnebrew et al. | |
| 2014/0191927 | A1 | 7/2014 | Cho | |
| 2014/0237366 | A1 | 8/2014 | Poulos et al. | |
| 2014/0247208 | A1* | 9/2014 | Henderek | G06F 3/0481 345/156 |
| 2014/0247210 | A1 | 9/2014 | Henderek et al. | |
| 2014/0250406 | A1* | 9/2014 | Seo | G06F 3/0488 715/781 |
| 2014/0267010 | A1* | 9/2014 | Pasquero | G06T 19/006 345/156 |
| 2014/0361984 | A1* | 12/2014 | Kim | G06F 3/013 345/156 |
| 2014/0380230 | A1* | 12/2014 | Venable | G06F 3/013 715/781 |
| 2015/0049201 | A1* | 2/2015 | Liu | H04N 17/00 348/189 |
| 2015/0131850 | A1* | 5/2015 | Qvarfordt | G06K 9/00617 382/103 |
| 2015/0279389 | A1* | 10/2015 | LeBeau | G06F 3/167 704/275 |
| 2015/0331590 | A1* | 11/2015 | Yasui | G06F 3/04842 715/765 |
| 2015/0338651 | A1* | 11/2015 | Wang | G06F 1/163 345/8 |
| 2016/0109957 | A1* | 4/2016 | Takashima | G06F 1/163 345/8 |
| 2017/0038831 | A1* | 2/2017 | Vidal | G06F 3/011 |

OTHER PUBLICATIONS

ISA European Patent Office, International Search Report and Written Opinion Issued in PCT Application No. PCT/US2015/062051, dated Jan. 29, 2016, WIPO, 11 Pages.

Jacob, R. et al., "Hot Topics-Eye-Gaze Computer Interfaces: What You Look at is What You Get," IEEE Computer, vol. 26, No. 7, Jul. 1993, 2 pages.

IPEA European Patent Office, Second Written Opinion Issued in PCT Application No. PCT/US2015/062051, dated Nov. 2, 2016, WIPO, 6 Pages.

IPEA European Patent Office, International Preliminary Report on Patentability Issued in PCT Application No. PCT/US2015/062051, dated Feb. 21, 2017, WIPO, 8 pages.

* cited by examiner

GAZE TARGET APPLICATION LAUNCHER

BACKGROUND

Computing devices may execute applications for carrying out operations. In order to access the applications of a computing device, a user interface element with indications of available applications may be presented for selection.

SUMMARY

Embodiments are disclosed for controlling a location of an application launcher for a computing device. An example method includes recognizing a gaze target, and, responsive to a user trigger, displaying an application launcher at the gaze target. The method further includes recognizing a user selection of one of the plurality of applications, and replacing the application launcher with the selected one of the plurality of applications at the gaze target.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Computing devices of the present disclosure are configured to facilitate application launching. In one example, an augmented reality computing device may recognize the gaze target at which a user is looking. Responsive to a user trigger, the augmented reality computing device is configured to display an augmented reality image of an application launcher (or an application launcher affordance or preview) so that the application launcher appears to be located at the gaze target. Applications subsequently launched from the application launcher may replace the application launcher. As such, by selecting a location for the application launcher, the user is effectively selecting a location for a subsequently launched application. Both selections are based on the user's gaze. In another example, a user's gaze onto a conventional display is assessed, an application launcher or preview is displayed at the display location of the gaze, and a launched application replaces the application launcher responsive to user selection.

In augmented reality environments, the application launcher allows a user to launch applications "out of thin air" or as an overlay on any suitable surface in the real-world environment without leaving the augmented reality experience. In such environments, the application launcher may be world-locked, such that the launcher appears to stay in the same position relative to real-world objects, regardless of the movements of the head-mounted display device. In other implementations, the application launcher may be body-locked, such that it appears to move with the user. In some implementations, an application launcher can be switched between world-locked and body-locked modes.

Figure 1:
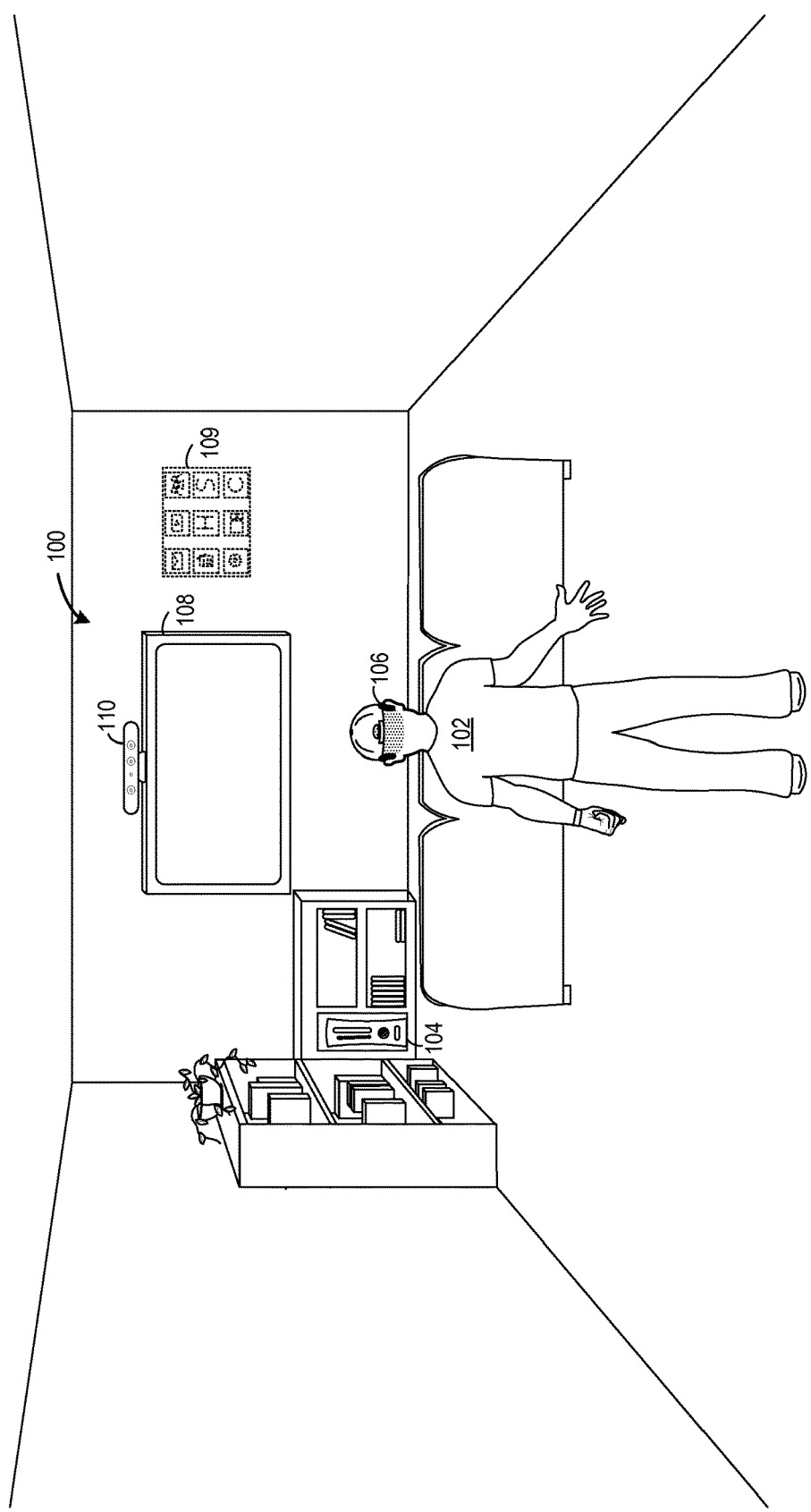
FIG. 1 shows an example environment for interacting with a computing device and associated display.

FIG. 1 shows an example environment 100 in which a user 102 may interact with one or more of computing device 104 and head-mounted display device 106 to launch applications. For example, applications may be launched using the head-mounted display device 106. Computing device 104 may include any suitable computing device, including but not limited to a video game console, a home entertainment device (e.g., an audio/video receiver), a personal computing device, a laptop, a smart phone, a tablet computing device, and/or any other suitable computing system. Head-mounted display device 106 may include one or more output devices, such as see-through display(s) for presenting display data as an augmentation to a real-world environment viewable through the see-through display(s) and speaker(s) for outputting audio data. Head-mounted display (HMD) device 106 may further include one or more sensor subsystems integrated into the HMD device or communicatively coupled to the HMD device. For example, the one or more sensor subsystems may include but are not limited to an eye-tracking camera (e.g., a rearward-facing camera configured to capture images of an eye of a wearer of the head-mounted display device to determine a gaze target of the wearer), a microphone, and a forward-facing camera (e.g., for capturing images of an environment).

Computing device 104 and/or head-mounted display device 106 may be communicatively connected to display device 108 and/or the see-through display(s) of head-mounted display device 106 for presenting an application launcher and/or one or more launched applications. In other implementations, application launching functionality may be handled by an on-board computing system of the display device 108 and/or the head-mounted display device 106. In still other implementations, at least some of the application launching functionality may be handled by a remote computer or service. An example application launcher 109 is shown on a wall of the environment, the dashed lines indicating that the application launcher is viewable as an augmentation to the environment through the head-mounted display device 106. Application launcher 109 may include one or more icons or other user interface elements indicating one or more applications that may be launched via selection of the respective user interface element.

Sensor 110 may include one or more of a visible light camera, an infrared camera, and/or a visible/infrared light projector for capturing RGB image data/frames and/or depth image data/frames (e.g., of environment 100). In some examples, one or more cameras of sensor 110 may be eye-tracking cameras configured to capture images of a user's eye for determining a gaze target of the user. Sensor 110 may additionally or alternatively include one or more directional microphones for receiving sound (e.g., from environment 100).

Figure 2:
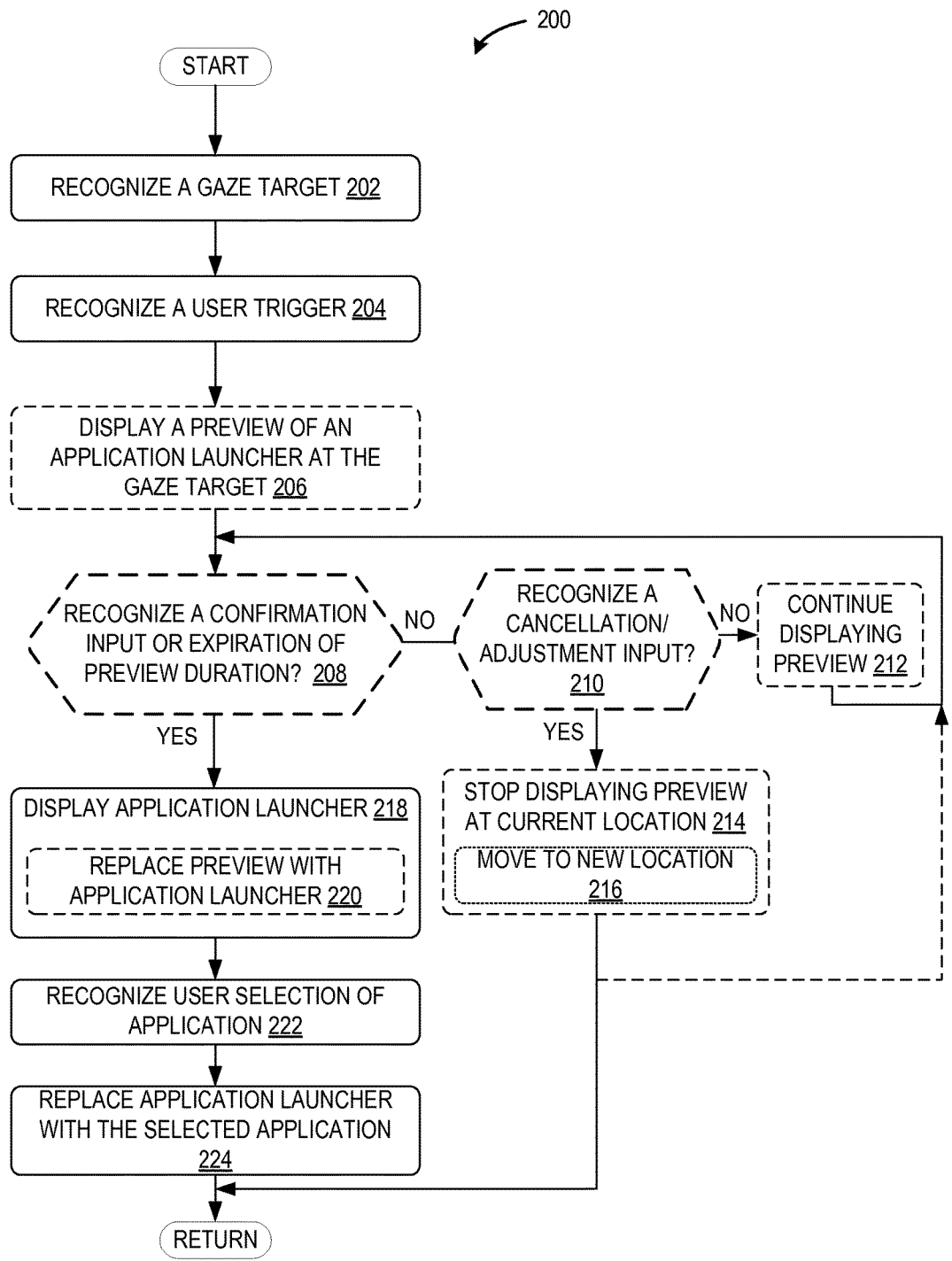
FIG. 2 is a flow chart of an example method for controlling a position of an application launcher.

FIG. 2 is a flow chart of a method 200 for controlling a position of an application launcher. Method 200 may be performed by any suitable computing device, including but not limited to computing device 104, head-mounted display device 106, or a remote computing device or service. At 202, method 200 includes recognizing a gaze target. Any suitable gaze tracking technique may be performed to recognize the gaze target. For example, the eye-tracking camera of head-mounted display device 106 and/or an eye-tracking camera of sensor 110 of FIG. 1 may capture images of a user's eye in order to determine a gaze direction. The gaze direction may include a vector extending from the user's eye toward a display or surface (e.g., a see-through display of head-mounted display device 106, display device 108 of FIG. 1, and/or a surface on which a projector may project images). The location (e.g., a pixel coordinate) at which the vector of the gaze direction intersects the display may be determined to be the gaze target (e.g., the location on the display at which the gaze is directed). In other examples, a gaze target may be recognized by tracking a head movement. In such examples, the term "gaze" as used herein may refer to a head-targeting gaze.

At 204, the method includes recognizing a user trigger indicating a request to display an application launcher. The user trigger may include any suitable user input recognizable by the computing device and/or head-mounted display device. For example, the user trigger may include a gesture (e.g., a hand, face, and/or body gesture) recognized via one or more of the eye-tracking camera (e.g., as used for recognizing the gaze target) and another imaging device (e.g., a visible light, infrared, or depth camera for imaging the environment, such as sensor 110 of FIG. 1). The user trigger may additionally or alternatively include a voice command recognized via a microphone and one or more voice recognition modules (e.g., local to the computing device and/or within a remote service communicatively connected to the computing device). In additional or alternative examples, the user trigger may include a sustained gaze (e.g., a recognition that a user gaze is directed to the gaze target and/or the gaze target is maintained for a duration that is greater than a trigger threshold). A user trigger including a gaze target recognition may include identifying that the gaze is directed to an "empty" region of a display, user interface, and/or environment. For example, an "empty" region may include a region that does not include a user interface element and/or a region that does not include a selectable real-world or displayed object.

The user trigger may additionally or alternatively include a gaze directed at a user interface element displayed on the display device, a physical button actuation on a control device or other input device (e.g., a control device external to the head-mounted display and/or the computing device used to launch applications), and/or any other suitable user input. It is to be understood that any combination of user inputs may be recognized as a user trigger.

As indicated at 206, the method may include displaying a positional preview of an application launcher (e.g., application launcher 109 of FIG. 1) at the gaze target responsive to a user trigger. Displaying a positional preview of the application launcher may provide an opportunity for the user to fine tune the placement of the application launcher. The positional preview may also allow the user to confirm that the placement of an application launcher in the location indicated by the preview is the intended result of the gaze target and user trigger. For example, the positional preview may be an outline of an application launcher (e.g., an outline of the outer edges of the user interface element or application window corresponding to the application launcher). In additional or alternative examples, the positional preview may be a semi-transparent version of the application launcher, an animation of the application launcher, and/or an otherwise modified version of the application launcher (e.g., having a different size, rotation, shape, and/or other feature) that provides an indication of a position, size, and/or shape with which the application launcher will be displayed. In some examples, a center of the positional preview may be at a same pixel coordinate in the display as the application launcher (once the positional preview is accepted). In this way, the preview may provide an approximation of the appearance, size, position, and/or other feature of the to-be-displayed application launcher and/or application (e.g., to allow a user to determine an amount of space the application that will be launched will occupy).

As indicated at 208, method 200 may include determining if a confirmation input or an expiration of the preview duration has been recognized. The confirmation input may include any suitable user input, including but not limited to one or more of the examples described above with respect to the user trigger. For example, the confirmation input may include a gesture recognizable by a camera integrated in and/or remote to a head-mounted display. The positional preview may additionally or alternatively have a predefined (e.g., defined by a manufacturer and/or within user-controlled settings) preview duration defining an amount of time to display the preview absent user input confirming/cancelling/adjusting the preview.

If no confirmation input is recognized and the preview duration has not expired at 208 (e.g., "NO" at 208), the method may proceed to 210 to determine whether a cancellation or adjustment input is recognized. A cancellation input may include a suitable user input (e.g., any combination of one or more of the above-described user input examples) indicating an intent to cancel presentation of the application launcher (and the associated positional preview). For example, a cancellation input may allow a user to indicate a false positive user trigger recognition. An adjustment input may include a different user input from the cancellation input, which identifies a user intent to adjust a position of the positional preview (and a subsequently-displayed application launcher). An adjustment input may include a user input indicating a direction in which to move the positional preview, an amount to move the positional preview, and/or a location on the display at which an edge, center, and/or other portion of the positional preview is to be placed. For example, a user may perform a gesture indicating an adjustment is to be made, and gaze at a new location at which the center of the preview is to be placed.

If a cancellation and/or adjustment input is not received at 210 (e.g., "NO" at 210), the method may proceed to 212 to continue displaying the preview at the current location and return to 208 to continue checking for a confirmation input and/or expiration of the preview duration. Conversely, if a cancellation and/or adjustment input is received at 210 (e.g., "YES" at 210), the method may proceed to 214 to stop displaying the preview at the current location. For example, if a cancellation input is recognized at 210, the preview may be completely removed from the display, and the method may end and/or return to 202 to recognize a new gaze target. If an adjustment input is recognized at 210, the method may include moving the preview to a new location, as indicated at 216, and return to 208 to determine if the new location is acceptable based on a confirmation input and/or expiration of a preview duration.

Returning to 208, if a confirmation input or an expiration of the preview duration is recognized (e.g., "YES" at 208), the method proceeds to 218 to display an application launcher. For example, the positional preview may be replaced with the application launcher as indicated at 220, such that at least an edge, center, or other portion of the application launcher is placed at a respective location of an edge, center, or other portion of the positional preview (e.g., displayed at 206 and/or in the new location at 216). It is to be understood that in examples where a preview is not displayed (e.g., where 206-216 are not performed), the application launcher may be displayed at 218 directly responsive to the user trigger recognized at 204. An example application launcher 109 is shown in FIG. 1 and further examples are described below with respect to FIGS. 4A, 4B, and 5. It is also to be understood that in some examples, the preview duration may be associated with a cancellation of the positional preview and application launcher displaying, rather than a confirmation. In such examples, an expiration of the preview duration at 208 may cause the method to proceed to 214, rather than 218.

The application launcher displayed at 218 may present a plurality of applications selectable for launching. For example, the application launcher may present all applications executable by the computing device and/or a subset of the applications executable by the computing device. In the latter example, the subset of applications may be automatically selected for presentation based on user preferences, a current context of the computing device (e.g., an environment of the computing device, a status of the computing device, a time of day, etc.), recent activity of the computing device (e.g., open or recently-used applications), the current gaze target, user instruction, and/or any other suitable parameter. The application launcher may include more applications than are viewable within the boundaries of the application launcher, and scrolling and/or page turning may be used to change the applications currently presented for launching.

At 222, method 200 includes recognizing a user selection of an application in the application launcher. User selection of the application may be performed in any suitable manner and include any of the above-described user input mechanisms. For example, a user may identify a particular application by providing a voice command identifying that application and/or directing a gaze toward a displayed user interface element within the application launcher identifying that application. As another example, the user may perform a pointing gesture recognized by one or more cameras.

As indicated at 224, the method includes replacing the application launcher with the selected application. For example, replacing the application launcher with the selected application may include displaying a graphical user interface element and/or window of the selected application at the gaze target and/or at the location of the application launcher. The replacement of the application launcher with the application may be similar to the optional replacement of the positional preview with the application launcher, such that a displayable portion of the application (e.g., an edge, center, boundaries, etc.) is aligned with a respective portion of the application launcher and displayed in place of the application launcher. As used herein, the term "launch" as applied to launching an application may include executing an application and/or bringing an application into focus/display (e.g., giving an already-executed/currently running application system-wide focus or otherwise bringing the application into view on the display in the location defined by the application launcher).

Figure 3:
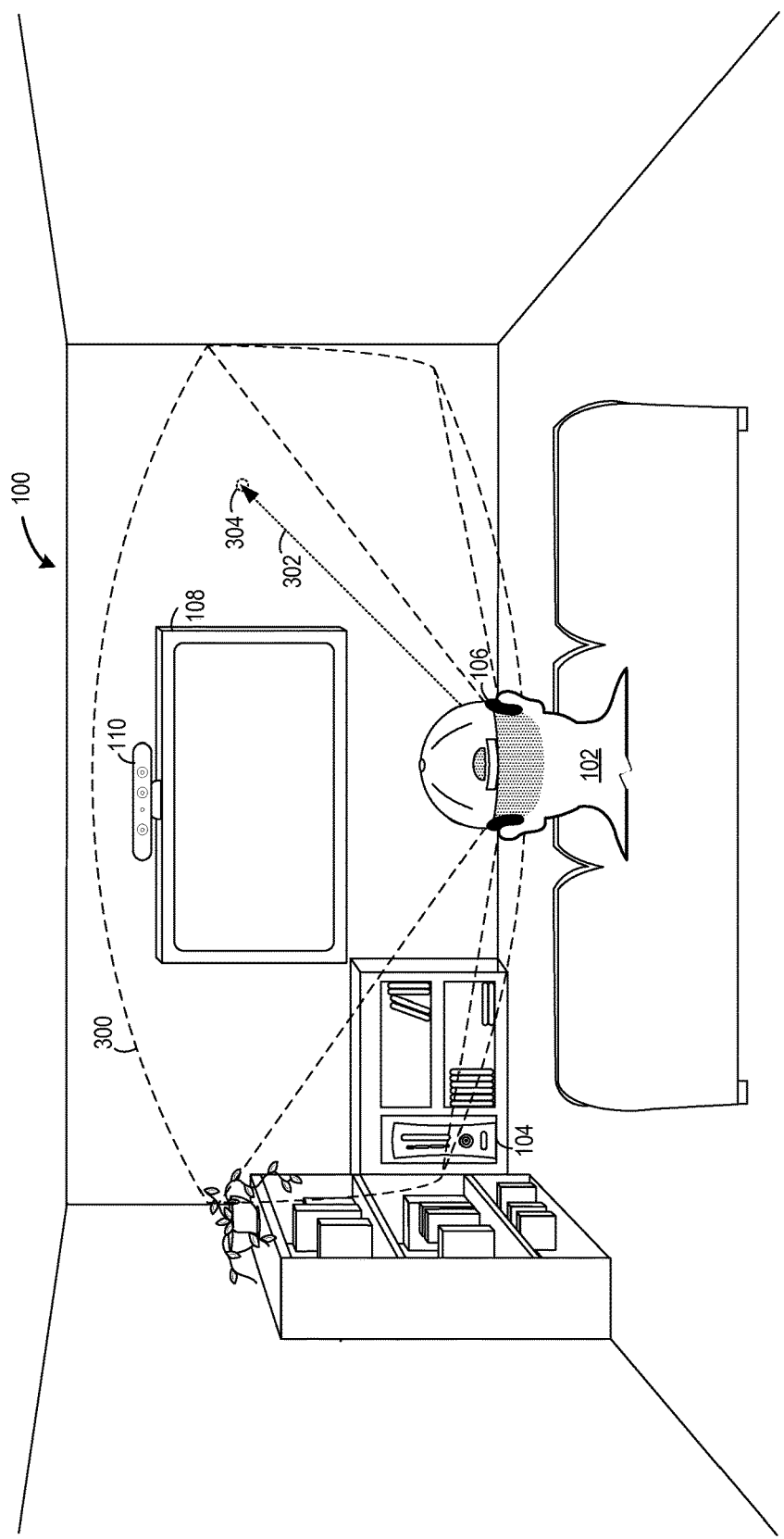
FIG. 3 shows an example field of view of a user of a head-mounted display device in the example environment of FIG. 1.

FIG. 3 shows an example field of view 300 of user 102 of head-mounted display device 106 within environment 100 of FIG. 1. For example, field of view 300 may represent a portion of environment 100 viewable through see-through display(s) of head-mounted display device 106. Within the field of view, the user may be gazing in a direction indicated by gaze line 302, which may correspond to a gaze target 304. For example, if the user intends to launch an application, the empty wall located at gaze target 304 may be selected.

Figure 4A:
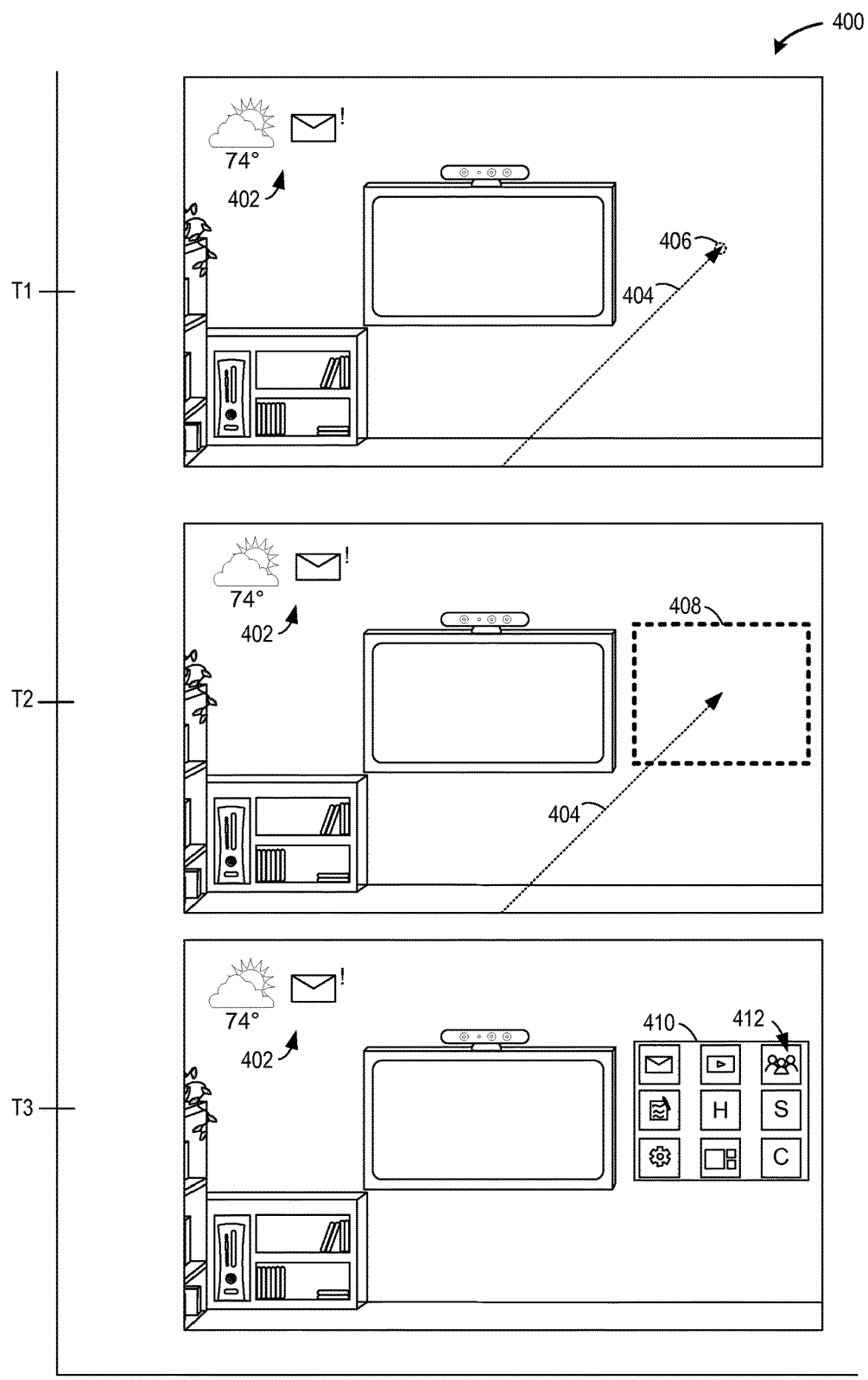
FIGS. 4A-4B show an example timeline of a field of view of a user through a head-mounted display.
Figure 4B:
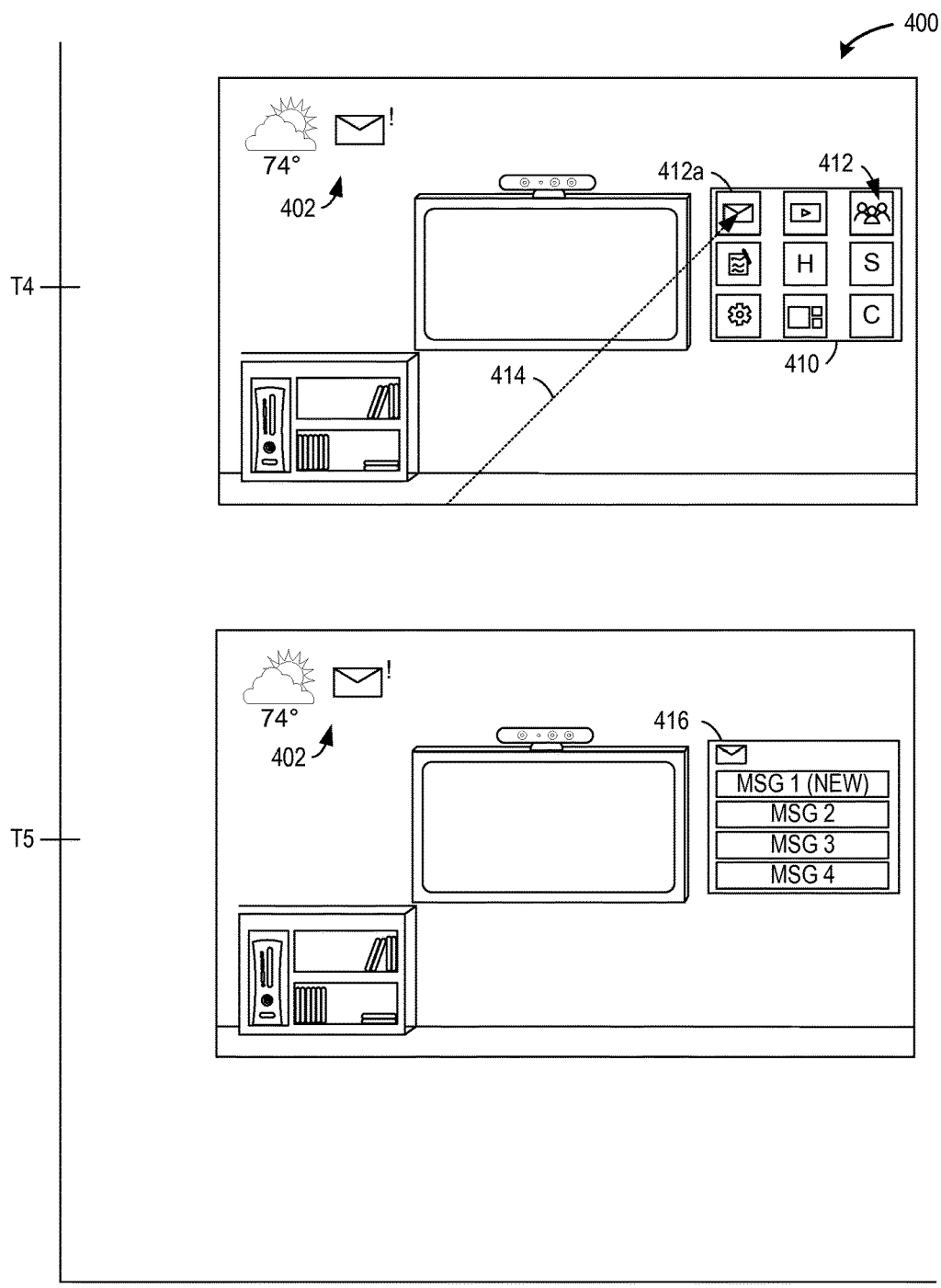

FIGS. 4A-4B show an example timeline 400 of fields of view through a see-through display of a head-mounted display (e.g., user 102 of head-mounted display device 106 in FIGS. 1 and 3). For example, within the field of view at time T1, real-world objects in environment 100, such as computing device 104, display device 108, and sensor device 110 of FIG. 1, may be viewable alongside displayed augmentation elements, such as notification icons 402 (e.g., showing a weather and a new message indication). As represented by gaze line 404, the user's gaze may be directed toward gaze target 406, corresponding to a wall in the real-world environment.

Before time T2, a user trigger is recognized, indicating an intent to display an application launcher at the gaze target 406. For example, the user trigger may be performed and/or recognized at some time between times T1 and T2. Accordingly, a positional preview 408 of the application launcher may be displayed as an augmentation to the real-world environment, such that the preview is centered at the gaze target.

Before time T3, a confirmation input is recognized, indicating a confirmation that the positional preview is representative of an intended location of the application launcher. For example, the confirmation input may have been performed and/or recognized at some point between times T2 and T3. Accordingly, the positional preview 408 is replaced with an application launcher 410. The application launcher 410 includes a plurality of icons 412, each icon identifying a different selectable application for launching. The application launcher occupies the same space previously occupied by the positional preview.

At time T4, a user gaze indicated by gaze line 414 is directed to a selected one of the icons 412 (e.g., icon 412a). A user selection of the application is performed at some time between times T4 and T5. Accordingly, at time T5, the application launcher is replaced with the selected application (e.g., a user interface window 416 associated with the selected application). In the illustrated example, the selected application is presented within the same boundaries as the application launcher, however other configurations may be provided. For example, the center of the user interface window 416 may be positioned at the same location as the center of the application launcher 410, but the launched application may have a different size, orientation, and/or shape as the application launcher.

Figure 5:
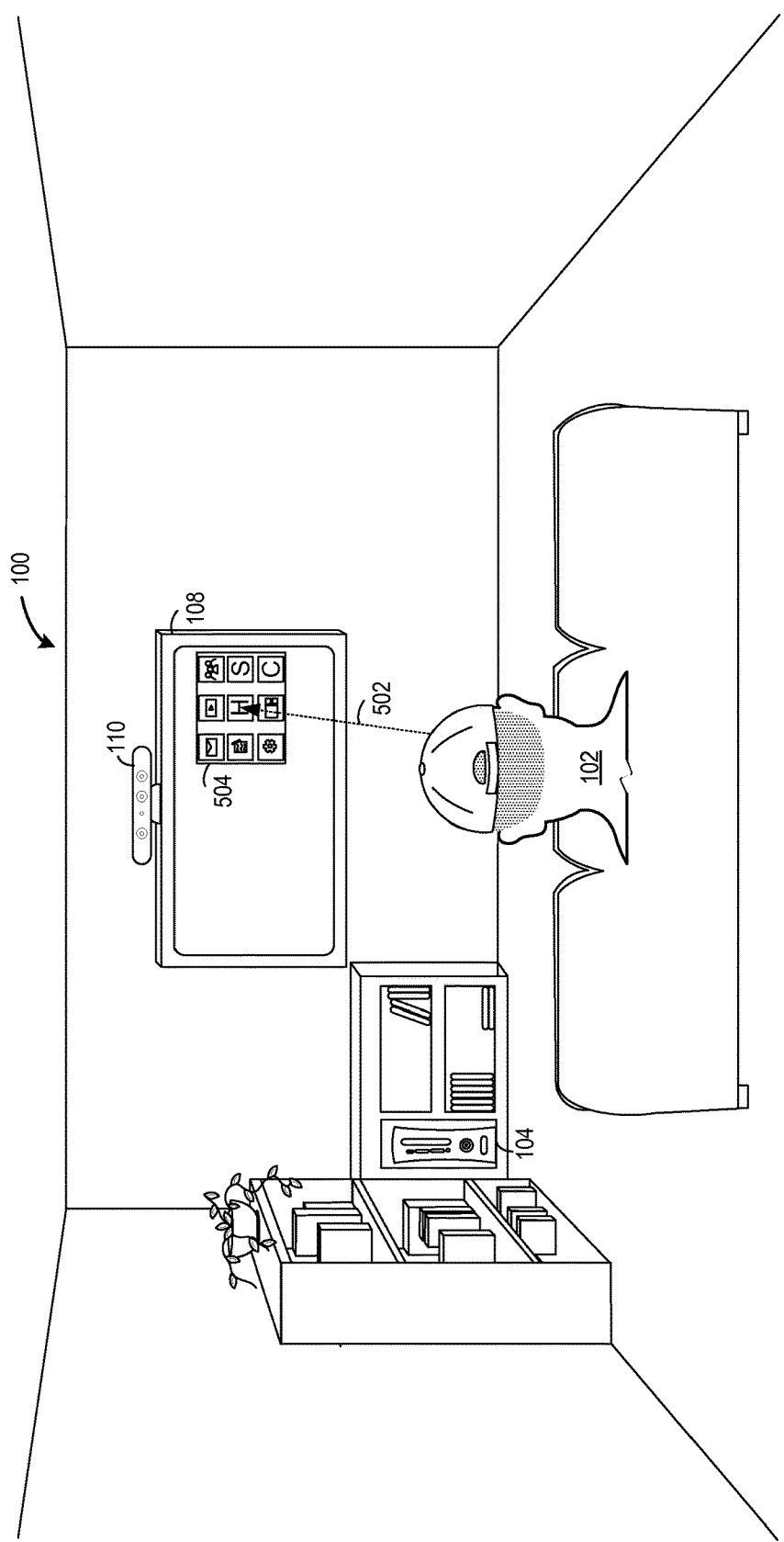
FIG. 5 shows an example environment for presenting an application launcher on a display device.

FIG. 5 shows an example scenario in which user 102 in environment 100 of FIG. 1 interacts with computing device 104 and display device 108, rather than head-mounted display device 106 and associated see-through display(s). As illustrated, a gaze of user 102, represented by gaze line 502, in combination with a user trigger may cause computing system 104 to display application launcher 504 on display device 108. For example, sensor device 110 may image an eye of user 102 and transmit the images to computing device 104. Computing device 104 may analyze the images and/or transmit the images to a remote service (e.g., a cloud computing device) via a network for remote processing/analysis. Upon analyzing the images, the computing device may determine a gaze direction and map the gaze direction to a location on display device 108 to determine a gaze target. Responsive to a user trigger and/or a confirmation of a positional preview, the computing device 104 may instruct the display device to display the application launcher at the location of the gaze target (e.g., center the application launcher at the gaze target).

The above-described methods and systems may provide a seamless application launching experience for a user of a computing device and/or head-mounted display device. By allowing application launchers (and subsequently selected applications) to be positioned in a location of a user's choosing, the user may ensure that new applications are able to be launched without cumbersome rearrangements of existing displayed objects or interference from real-world objects in an augmented reality environment.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
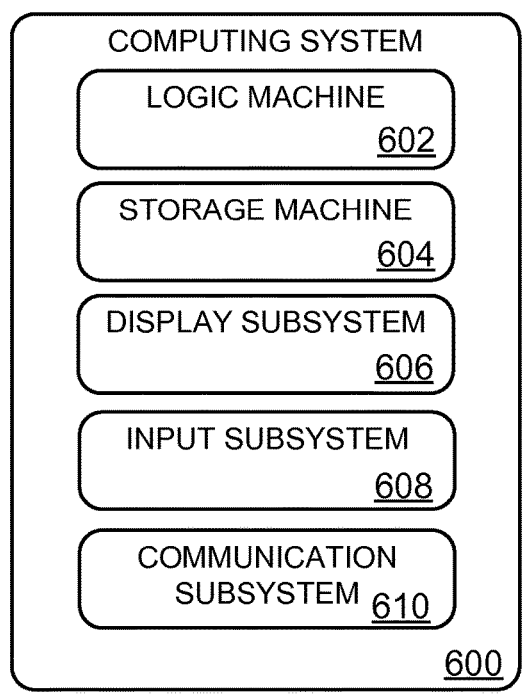
FIG. 6 is a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more head-mounted display devices, wearable devices, personal computers, server computers, tablet computers, home-entertainment computers, network computing devices, gaming devices, mobile computing devices, mobile communication devices (e.g., smart phone), and/or other computing devices. For example, computing system 600 may include and/or be included in computing device 104 and/or head-mounted display device 106 of FIGS. 1, 3, and 5.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. For example, responsive to instructions from a logic machine of head-mounted display device 106 of FIG. 1, the state of a see-through display may be transformed to display an application launcher thereon responsive to recognition of a user trigger. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Figure 7:
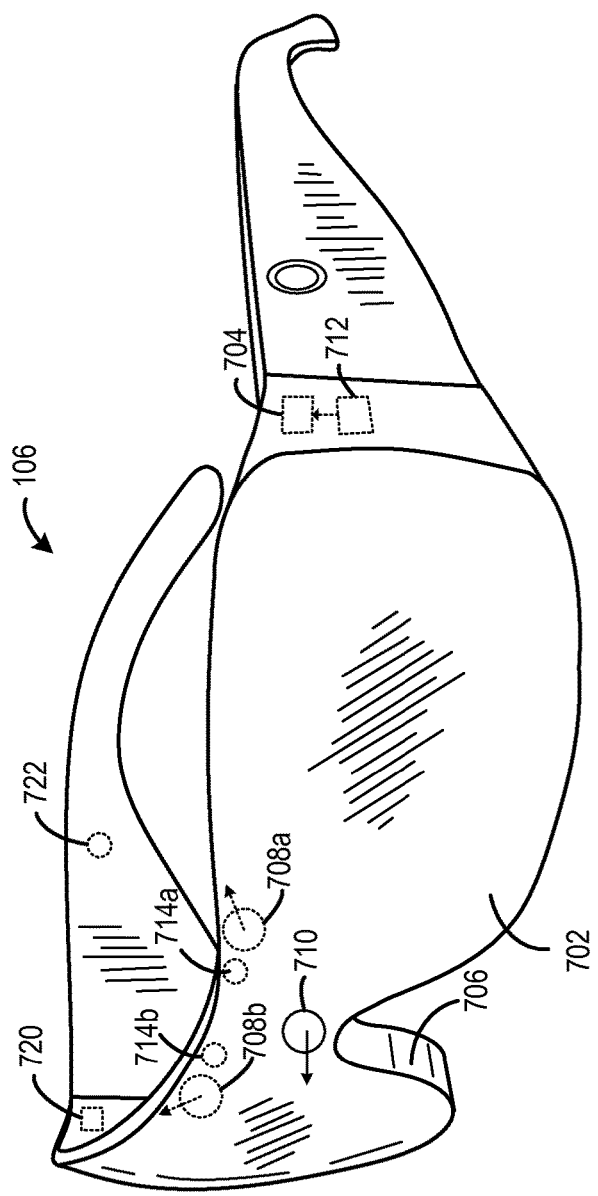
FIG. 7 schematically shows an example of a head-mounted display device.

FIG. 7 shows a non-limiting example of the HMD device 106 of FIGS. 1 and 3 in the form of a pair of wearable glasses with a see-through display 702. It will be appreciated an HMD device may take any other suitable form in which a transparent, semi-transparent, and/or non-transparent display is supported in front of a viewer's eye or eyes. Further, embodiments described herein may be used with any other suitable computing device, including but not limited to mobile computing devices, laptop computers, desktop computers, tablet computers, other wearable computers, etc.

The HMD device 106 includes a see-through display 702 and a controller 704. The see-through display 702 may enable images such as holographic objects to be delivered to the eyes of a wearer of the HMD device. The see-through display 702 may be configured to visually augment an appearance of a real-world, physical environment to a wearer viewing the physical environment through the transparent display. In one example, the display may be configured to display one or more UI objects on a graphical user interface. In some embodiments, the UI objects presented on the graphical user interface may be virtual objects overlaid in front of the real-world environment. Likewise, in some embodiments, the UI objects presented on the graphical user interface may incorporate elements of real-world objects of the real-world environment seen through the see-through display 702. In other examples, the display may be configured to display one or more other graphical objects, such as virtual objects associated with games, videos, or other visual content.

Any suitable mechanism may be used to display images via the see-through display 702. For example, the see-through display 702 may include image-producing elements located within lenses 706 (such as, for example, a see-through Organic Light-Emitting Diode (OLED) display). As another example, the see-through display 702 may include a display device (such as, for example a liquid crystal on silicon (LCOS) device or OLED microdisplay) located within a frame of HMD device 106. In this example, the lenses 706 may serve as, or otherwise include, a light guide for delivering light from the display device to the eyes of a wearer. Such a light guide may enable a wearer to perceive a 3D holographic image located within the physical environment that the wearer is viewing, while also allowing the wearer to view physical objects in the physical environment, thus creating a mixed reality environment.

The HMD device 106 may also include various sensors and related systems to provide information to the controller 704. Such sensors may include, but are not limited to, one or more inward facing image sensors 708a and 708b, one or more outward facing image sensors 710, an inertial measurement unit (IMU) 712, and one or more microphones 720. The one or more inward facing image sensors 708a, 708b may be configured to acquire image data in the form of gaze tracking data from a wearer's eyes (e.g., sensor 708a may acquire image data for one of the wearer's eye and sensor 708b may acquire image data for the other of the wearer's eye). The HMD device may be configured to determine gaze directions of each of a wearer's eyes in any suitable manner based on the information received from the image sensors 708a, 708b. For example, one or more light sources 714a, 714b, such as infrared light sources, may be configured to cause a glint of light to reflect from the cornea of each eye of a wearer. The one or more image sensors 708a, 708b may then be configured to capture an image of the wearer's eyes. Images of the glints and of the pupils as determined from image data gathered from the image sensors 708a, 708b may be used by the controller 704 to determine an optical axis of each eye. Using this information, the controller 704 may be configured to determine a direction the wearer is gazing. The controller 704 may be configured to additionally determine an identity of a physical and/or virtual object at which the wearer is gazing.

The one or more outward facing image sensors 710 may be configured to receive physical environment data from the physical environment in which the HMD device 106 is located. Data from the outward facing image sensors 710 may be used to detect movements within a field of view of the display 702, such as gesture-based inputs or other movements performed by a wearer or by a person or physical object within the field of view. In one example, data from the outward facing image sensors 710 may be used to detect a selection input performed by the wearer of the HMD device, such as a gesture (e.g., a pinching of fingers, closing of a fist, etc.), that indicates selection of a UI object displayed on the display device. Data from the outward facing sensors may also be used to determine direction/location and orientation data (e.g. from imaging environmental features) that enables position/motion tracking of the HMD device 106 in the real-world environment.

The IMU 712 may be configured to provide position and/or orientation data of the HMD device 106 to the controller 704. In one embodiment, the IMU 712 may be configured as a three-axis or three-degree of freedom position sensor system. This example position sensor system may, for example, include three gyroscopes to indicate or measure a change in orientation of the HMD device 106 within 3D space about three orthogonal axes (e.g., x, y, z) (e.g., roll, pitch, yaw). The orientation derived from the sensor signals of the IMU may be used to display, via the see-through display, one or more virtual UI objects in three degrees of freedom.

In another example, the IMU 712 may be configured as a six-axis or six-degree of freedom position sensor system. Such a configuration may include three accelerometers and three gyroscopes to indicate or measure a change in location of the HMD device 106 along the three orthogonal axes and a change in device orientation about the three orthogonal axes. In some embodiments, position and orientation data from the outward facing image sensors 710 and the IMU 712 may be used in conjunction to determine a position and orientation of the HMD device 106.

The HMD device 106 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

Continuing with FIG. 7, the controller 704 may be configured to record multiple eye gaze samples over time based on information detected by the one or more inward facing image sensors 708a, 708b. For each eye gaze sample, eye tracking information and, in some embodiments, head tracking information (from image sensors 710 and/or IMU 712) may be used to estimate an origin point and a direction vector of that eye gaze sample to produce an estimated location at which the eye gaze intersects the see-through display. Examples of eye tracking information and head tracking information used to determine an eye gaze sample may include an eye gaze direction, head orientation, eye gaze velocity, eye gaze acceleration, change in angle of eye gaze direction, and/or any other suitable tracking information. In some embodiments, eye gaze tracking may be recorded independently for both eyes of the wearer of the HMD device 106.

As mentioned above, the HMD device 106 may also include one or more microphones, such as microphone 720, that capture audio data. In some examples, the one or more microphones 720 may comprise a microphone array including two or more microphones. For example, the microphone array may include four microphones, two positioned above the right lens and two positioned above the left lens of the HMD device. Further, audio outputs may be presented to the wearer via one or more speakers, such as speaker 722. In some embodiments, the microphone system may be configured to provide audio feedback indicating selection of a UI object presented on a graphical user interface displayed on the see-through display.

The controller 704 may include a logic machine and a storage machine, discussed in more detail above with respect to FIG. 6, in communication with the various sensors and display of the HMD device. In one example, the storage machine may include instructions that are executable by the logic machine to provide sound for a displayed virtual object to one or more external speakers, as described herein.

Another example provides a method comprising recognizing, via an eye-tracking camera, a gaze target, responsive to a user trigger, displaying, via a display, an application launcher at the gaze target, the application launcher presenting a plurality of applications selectable for launching, recognizing a user selection of one of the plurality of applications, and replacing, via the display, the application launcher with the selected one of the plurality of applications at the gaze target. In such an example, replacing the application launcher with the selected one of the plurality of applications may additionally or alternatively comprise displaying a graphical user interface element of the selected one of the plurality of applications at the gaze target. In such an example, the user trigger may additionally or alternatively comprise a gesture recognized via one or more of the eye-tracking camera and another imaging device. In such an example, the user trigger may additionally or alternatively comprise a voice command recognized via a microphone. In such an example, the user trigger may additionally or alternatively comprise a sustained gaze, and the method may additionally or alternatively further comprise recognizing the user trigger responsive to recognizing, via the eye-tracking camera, that a user gaze is directed to the gaze target for a duration that is greater than a trigger threshold. In such an example, the method may additionally or alternatively further comprise, prior to displaying the application launcher, displaying a positional preview of the application launcher at the gaze target. In such an example, the method may additionally or alternatively further comprise replacing, via the display, the positional preview of the application launcher with the application launcher responsive to a confirmation input. In such an example, the display may additionally or alternatively comprise a see-through display of a head-mounted display device and the eye-tracking camera may additionally or alternatively be integrated into the head-mounted display device. In such an example, the display may additionally or alternatively comprise a see-through display of a head-mounted display device and the user trigger may additionally or alternatively be recognized based upon analysis of an image captured by an imaging device remote from the head-mounted display device. Any or all of the above-described examples may be combined in any suitable manner in various implementations.

Another example provides a head-mounted display device comprising an eye-tracking camera, a see-through display, a logic machine, and a storage machine holding instructions executable by the logic machine to recognize, via the eye-tracking camera, a gaze target, responsive to a user trigger, display, via the see-through display, an application launcher at the gaze target, the application launcher presenting a plurality of applications selectable for launching, recognize a user selection of one of the plurality of applications, and replace, via the display, the application launcher with the selected one of the plurality of applications at the gaze target. In such an example, the head-mounted display device may additionally or alternatively further comprise an input subsystem, and the user trigger may additionally or alternatively be detected via the input subsystem. In such an example, the user trigger may additionally or alternatively comprise a gesture recognized via one or more of the head-mounted display device and a camera remote from the head-mounted display device. In such an example, the head-mounted display device may additionally or alternatively further comprise a microphone, and the user trigger may additionally or alternatively comprise a voice command recognized via the microphone. In such an example, the user trigger may additionally or alternatively comprise a sustained gaze, and the instructions may additionally or alternatively be further executable to recognize the sustained gaze responsive to determining, via the eye-tracking camera, that the gaze target is maintained for a duration that is greater than a trigger threshold. In such an example, replacing the application launcher with the selected one of the plurality of applications may additionally or alternatively comprise displaying, via the see-through display, a graphical user interface element of the selected one of the plurality of applications at the gaze target. In such an example, the instructions may additionally or alternatively be further executable to, prior to displaying the application launcher, display, via the see-through display, a positional preview of the application launcher at the gaze target. In such an example, the instructions may additionally or alternatively be further executable to replace, via the see-through display, the positional preview of the application launcher with the application launcher responsive to a confirmation input. Any or all of the above-described examples may be combined in any suitable manner in various implementations.

Another example provides a head-mounted display device comprising an eye-tracking camera, an input subsystem, a see-through display, a logic machine, and a storage machine holding instructions executable by the logic machine to recognize, via the eye-tracking camera, a gaze target, responsive to a user trigger detected via the input subsystem, display, via the see-through display, a positional preview of an application launcher at the gaze target, responsive to a confirmation input detected via the input subsystem, replacing, via the see-through display, the positional preview of the application launcher with the application launcher presenting a plurality of applications selectable for launching, recognize a user selection of one of the plurality of applications, and replace, via the display, the application launcher with the selected one of the plurality of applications at the gaze target. In such an example, the user trigger may additionally or alternatively comprise a sustained gaze, and the instructions may additionally or alternatively be further executable to recognize the sustained gaze responsive to determining, via the eye-tracking camera, that the gaze target is maintained for a duration that is greater than a trigger threshold. In such an example, the user trigger may additionally or alternatively comprise one or more of a gesture and a voice command recognized via the input subsystem. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising:
   displaying, via a see-through display of a head-mounted display device, one or more augmentation elements;
   recognizing, via an eye-tracking camera of the head-mounted display device, a gaze target on a surface in a real-world environment viewed through the see-through display;
   responsive to a user trigger, displaying, via the see-through display, an application launcher overlaid on the surface of the real-world environment at the gaze target, the application launcher having a world-locked position relative to the real-world environment such that the application launcher does not appear to move relative to the real-world environment when the head-mounted display device moves, the application launcher presenting a plurality of applications selectable for launching within a graphical boundary of the application launcher that occupies a region of the see-through display to allow for the one or more augmentation elements and one or more real-world objects in the real-world environment to be viewed outside of the graphical boundary of the application launcher through the see-through display;
   recognizing a user selection of one of the plurality of applications; and
   replacing, via the see-through display, the application launcher with the selected one of the plurality of applications by displaying a graphical user interface of the selected one of the plurality of applications at the world-locked position overlaid on the surface of the real-world environment where the application launcher was previously displayed such that the graphical user interface of the selected one of the plurality of applications is presented within the graphical boundary of the application launcher.

2. The method of claim 1, wherein the user trigger comprises a gesture recognized via one or more of the eye-tracking camera and another imaging device of the head-mounted display device.

3. The method of claim 1, wherein the user trigger comprises a voice command recognized via a microphone of the head-mounted display device.

4. The method of claim 1, wherein the user trigger comprises a sustained gaze, the method further comprising recognizing the user trigger responsive to recognizing, via the eye-tracking camera, that a user gaze is directed to the gaze target for a duration that is greater than a trigger threshold.

5. The method of claim 1, further comprising, prior to displaying the application launcher, displaying, via the see-through display, a positional preview of the graphical boundary of the application launcher overlaid on the surface of the real-world environment at the gaze target, the positional preview providing an indication of position, size, and/or shape of the graphical boundary within which the application launcher will be displayed.

6. The method of claim 5, further comprising replacing, via the see-through display, the positional preview of the graphical boundary of the application launcher with the application launcher presenting the plurality of applications selectable for launching within the graphical boundary of the application launcher responsive to a confirmation input.

7. The method of claim 1, wherein the application launcher is displayed, via the see-through display, with a center point of the application launcher positioned at the gaze target on the surface of the real-world environment, and wherein the graphical user interface of the selected one of the plurality of applications is displayed, via the see-through display, with a center point of the graphical user interface positioned at a same location where the center point of the application launcher was previously displayed.

8. A head-mounted display device comprising:
   an eye-tracking camera;
   a see-through display;
   a logic machine; and
   a storage machine holding instructions executable by the logic machine to:
   display, via the see-through display, one or more augmentation elements;
   recognize, via the eye-tracking camera, a gaze target on a surface in a real-world environment viewed through the see-through display;
   responsive to a user trigger, display, via the see-through display, an application launcher overlaid on the surface of the real-world environment at the gaze target, the application launcher having a world-locked position relative to the real-world environment such that the application launcher does not appear to move relative to the real-world environment when the head-mounted display device moves, the application launcher presenting a plurality of applications selectable for launching within a graphical boundary of the application launcher that occupies a region of the see-through display to allow for the one or more augmentation elements and one or more real-world objects in the real-world environment to be viewed outside of the graphical boundary of the application launcher through the see-through display;

recognize a user selection of one of the plurality of applications; and replace, via the see-through display, the application launcher with the selected one of the plurality of applications by displaying, in place of the application launcher, a graphical user interface of the selected one of the plurality of applications at the world-locked position overlaid on the surface of the real-world environment where the application launcher was previously displayed such that the graphical user interface of the selected one of the plurality of applications is presented within the graphical boundary of the application launcher.

9. The head-mounted display device of claim 8, further comprising an input subsystem, wherein the user trigger is detected via the input subsystem.

10. The head-mounted display device of claim 8, wherein the user trigger comprises a gesture recognized via one or more of the head-mounted display device and a camera remote from the head-mounted display device.

11. The head-mounted display device of claim 8, further comprising a microphone, and wherein the user trigger comprises a voice command recognized via the microphone.

12. The head-mounted display device of claim 8, wherein the user trigger comprises a sustained gaze, and wherein the instructions are further executable to recognize the sustained gaze responsive to determining, via the eye-tracking camera, that the gaze target is maintained for a duration that is greater than a trigger threshold.

13. The head-mounted display device of claim 8, the instructions further executable to, prior to displaying the application launcher, display, via the see-through display, a positional preview of the graphical boundary of the application launcher overlaid on the surface of the real-world environment at the gaze target, the positional preview providing an indication of position, size, and/or shape of the graphical boundary within which the application launcher will be displayed.

14. The head-mounted display device of claim 13, the instructions further executable to replace, via the see-through display, the positional preview of the graphical boundary of the application launcher with the application launcher presenting the plurality of applications selectable for launching within the graphical boundary of the application launcher responsive to a confirmation input.

15. A head-mounted display device comprising:
an eye-tracking camera;
an input subsystem;
a see-through display;
a logic machine; and
a storage machine holding instructions executable by the logic machine to:
display, via the see-through display, one or more augmentation elements;
recognize, via the eye-tracking camera, a gaze target on a surface in a real-world environment viewed through the see-through display;
responsive to a user trigger detected via the input subsystem, display, via the see-through display, a positional preview of a graphical boundary of an application launcher overlaid on the surface of the real-world environment at the gaze target, the positional preview of the graphical boundary of the application launcher having a world-locked position relative to the real-world environment such that the positional preview of the graphical boundary of the application launcher does not appear to move relative to the real-world environment when the head-mounted display device moves, the positional preview of the graphical boundary of the application launcher providing an indication of position, size, and/or shape of the graphical boundary within which the application launcher will be displayed, and the positional preview of the graphical boundary of the application launcher occupying a region of the see-through display to allow for the one or more augmentation elements and one or more real-world objects in the real-world environment to be viewed outside of the graphical boundary of the application launcher through the see-through display, responsive to a confirmation input detected via the input subsystem, replacing, via the see-through display, the positional preview of the graphical boundary of the application launcher with the application launcher by displaying, in place of the positional preview of the graphical boundary of the application launcher, the application launcher overlaid on the surface of the real-world environment at the gaze target where the positional preview of the graphical boundary of the application launcher was previously displayed, the application launcher having a world-locked position relative to the real-world environment such that the application launcher does not appear to move relative to the real-world environment when the head-mounted display device moves, the application launcher presenting a plurality of applications selectable for launching within the graphical boundary of the application launcher that occupies the region of the see-through display to allow for the one or more augmentation elements and the one or more real-world objects in the real-world environment to be viewed outside of the graphical boundary of the application launcher through the see-through display;

recognize a user selection of one of the plurality of applications; and replace, via the see-through display, the application launcher with the selected one of the plurality of applications by displaying, in place of the application launcher, a graphical user interface of the selected one of the plurality of applications overlaid on the surface of the real-world environment where the application launcher was previously displayed such that the graphical user interface of the selected one of the plurality of applications is presented within the graphical boundary of the application launcher.

16. The head-mounted display device of claim 15, wherein the user trigger comprises a sustained gaze, and wherein the instructions are further executable to recognize the sustained gaze responsive to determining, via the eye-tracking camera, that the gaze target is maintained for a duration that is greater than a trigger threshold.

17. The head-mounted display device of claim 15, wherein the user trigger comprises one or more of a gesture and a voice command recognized via the input subsystem.

\* \* \* \* \*